(12) United States Patent
Carlsson et al.

(10) Patent No.: US 10,300,921 B2
(45) Date of Patent: May 28, 2019

(54) CONFIDENCE LEVEL DETERMINATION FOR ESTIMATED ROAD GEOMETRIES

(71) Applicant: VOLVO CAR CORPORATION, Gothenburg (SE)

(72) Inventors: Niklas Carlsson, Gothenburg (SE); Joakim Sorstedt, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 307 days.

(21) Appl. No.: 14/744,638

(22) Filed: Jun. 19, 2015

(65) Prior Publication Data
US 2015/0375752 A1    Dec. 31, 2015

(30) Foreign Application Priority Data

Jun. 26, 2014 (EP) ..................................... 14174445

(51) Int. Cl.
*B60W 40/06* (2012.01)
*G06K 9/00* (2006.01)
(Continued)

(52) U.S. Cl.
CPC ............ *B60W 40/06* (2013.01); *G01C 21/26* (2013.01); *G06K 9/00798* (2013.01); *G06K 9/72* (2013.01);
(Continued)

(58) Field of Classification Search
CPC ............ B60W 40/06; B60W 50/0097; B60W 2250/10; G01C 21/26
(Continued)

(56) References Cited

U.S. PATENT DOCUMENTS 6,718,259 B1    4/2004 Khosla
6,813,370 B1 *  11/2004 Arai ........................ G06T 7/593
                                              340/908.1
(Continued)

FOREIGN PATENT DOCUMENTS

EP    1489383       12/2004
EP    1489383 A3    7/2007
(Continued)

OTHER PUBLICATIONS

European Patent Office, European Search Report for corresponding European Patent Application No. 15 172 366.5, dated Oct. 16, 2015.
(Continued)

*Primary Examiner* — Dzung Tran
(74) *Attorney, Agent, or Firm* — Brooks Kushman P.C.

(57) ABSTRACT

The present disclosure relates to estimated road geometries used in vehicles, and in particular to a method and a control unit in a vehicle for determining a confidence level of an estimated road geometry. A method for determining a confidence level of an estimated road geometry is disclosed, the road geometry being estimated at least partly based on a position of a road object. The method comprises obtaining a reference position of the road object relative to the vehicle, updating a reach of a confidence zone of the vehicle, wherein a part of the estimated road geometry comprised within the confidence zone is associated with one or more reference confidence levels, and determining the confidence level of the estimated road geometry based on whether the reference position is comprised in the confidence zone.

14 Claims, 9 Drawing Sheets

(51) Int. Cl.
  *G01C 21/26* (2006.01)
  *G06K 9/72* (2006.01)
  *B60W 50/00* (2006.01)
(52) U.S. Cl.
  CPC ..... *B60W 50/0097* (2013.01); *B60W 2550/10* (2013.01); *B60W 2550/14* (2013.01); *B60W 2550/306* (2013.01); *B60W 2550/40* (2013.01)
(58) Field of Classification Search
  USPC .......................... 702/5; 701/23, 36, 536, 538
  See application file for complete search history.

(56) References Cited

U.S. PATENT DOCUMENTS

| | | | | |
|---|---|---|---|---|
| 2002/0131620 | A1* | 9/2002 | Shirato | G06K 9/00798 382/104 |
| 2010/0231718 | A1* | 9/2010 | Nakamori | G06K 9/00798 348/148 |
| 2010/0250064 | A1 | 9/2010 | Ota et al. | |
| 2011/0187515 | A1* | 8/2011 | Saito | B60T 7/22 340/425.5 |
| 2012/0215377 | A1 | 8/2012 | Takemura et al. | |
| 2012/0271483 | A1 | 10/2012 | Samukawa et al. | |
| 2012/0314070 | A1 | 12/2012 | Zhang et al. | |
| 2013/0179023 | A1 | 7/2013 | Schmidt | |
| 2013/0197804 | A1 | 8/2013 | Luke et al. | |
| 2014/0032072 | A1* | 1/2014 | Yoshihama | B60T 7/18 701/70 |

FOREIGN PATENT DOCUMENTS

| | | |
|---|---|---|
| EP | 2574958 | 4/2013 |
| WO | 2012104918 | 8/2012 |
| WO | 2012104918 A1 | 8/2012 |

OTHER PUBLICATIONS

European Patent Office, Written Opinion for corresponding European Patent Application No. 15 172 366.5 dated Oct. 16, 2015.
European Patent Office, Extended European Search Report for corresponding European Patent Application No. 15172366.5 dated Nov. 2, 2015.
Extended European Search Report for European Application No. 1417445.8, Completed by the European Patent Office, dated Dec. 19, 2014, 7 pages.

* cited by examiner

CONFIDENCE LEVEL DETERMINATION FOR ESTIMATED ROAD GEOMETRIES

CROSS-REFERENCE TO RELATED APPLICATIONS

This application claims priority to European Patent Application No. EP 14174445.8 filed on Jun. 26, 2014, the disclosure of which is incorporated in its entirety by reference herein.

TECHNICAL FIELD

The present disclosure relates to estimated road geometries used in vehicles, and in particular to a method and a control unit in a vehicle for determining a confidence level of an estimated road geometry.

BACKGROUND

Many vehicles today are increasingly aware of objects and traffic infrastructure in their vicinity. Road-users, such as pedestrians, bicyclists, and other vehicles, are detected by one or more on-board sensors in the vehicle, and their positions relative to the vehicle are determined. On-board sensors in the vehicle are also used to estimate the geometry of the road on which the vehicle is currently travelling. Control systems comprised in the vehicle then make use of this position and geometry data in, e.g., active safety applications or for autonomous drive of the vehicle. Some vehicles today also use wireless communications equipment for exchanging information with other road-users, and with the surrounding traffic infrastructure, in order to obtain further data related to the vehicle surroundings.

A wide variety of different techniques for estimating positions of road-users and for estimating road geometry exist in literature;

US 2012/0271483 discloses a method and apparatus for recognizing the shape of a road partly based on a detected object on the road. The disclosure relates to determining road geometry and also to determining a probability that other objects on the road are located in the same lane as the vehicle in which the method is implemented.

WO 2012/104918 teaches a road shape estimation device for estimation of road shape in a vehicle. The estimation of road shape is based on detecting an angle and position of another vehicle in front of the vehicle in which the device is implemented.

US 2010/0250064 discloses using lane markings and other objects on the road, as well as the motion of the own vehicle, in order to estimate road geometry.

Thus, there have been disclosed methods and devices for estimating road geometry in a vehicle. However, having access to an estimate of road geometry is not sufficient for many applications. The quality of the estimated road geometry is often also necessary to know.

Herein, the grade of knowledge about the quality of an estimated road geometry is referred to as the confidence level of the estimated road geometry. The confidence level of an estimate provides information about an expected error magnitude of the estimate. Thus, the accuracy of an estimated road geometry associated with a high confidence level is largely known, e.g., as accurate or as inaccurate, whereas an estimated road geometry associated with a low confidence level is not known to be either accurate or inaccurate, since the grade of knowledge about the quality of the estimated road geometry is low.

For instance, in an autonomous drive application the confidence level of an estimated road geometry is needed in order to decide when autonomous drive of the vehicle can be performed in a secure manner, and when autonomous drive should be terminated due to that the estimated road geometry cannot be trusted, either because the confidence level is high and the expected error magnitude in the estimate is known to be high, or because the confidence level is low such that the expected error magnitude is largely unknown.

Consequently, there is a need for methods for determining a confidence level of an estimated road geometry. These methods for determining confidence levels of estimated road geometries should be reliable, and preferably of low complexity, in order to enable efficient implementation.

SUMMARY

An object of the present disclosure is to mitigate, alleviate, or eliminate one or more of the above-identified deficiencies in the art and disadvantages singly or in any combination.

This object is obtained by a method performed in a vehicle for determining a confidence level of an estimated road geometry, which road geometry is estimated at least partly based on a position of a road object relative to the vehicle. The method comprises obtaining a reference position of the road object relative to the vehicle. The method also comprises updating a reach of a confidence zone of the vehicle, wherein a part of the estimated road geometry comprised within the confidence zone is associated with one or more known reference confidence levels, and determining the confidence level of the estimated road geometry based on whether the reference position is comprised in the confidence zone.

In this way, the vehicle is able to associate a confidence level to the estimated road geometry. Thus, the vehicle is not only aware of the geometry of roads in the vicinity of the vehicle, but also if the accuracy of the data is known or unknown, and consequently how much trust that can be placed in the estimated road geometry. This determined confidence level can be used as input to control systems in the vehicle which rely on the estimated road geometry, such as, e.g., lane departure warning systems or autonomous driving systems.

According to some embodiments, the method performed in a vehicle for determining a confidence level of an estimated road geometry, the road geometry being estimated at least partly based on a position of a road object relative to the vehicle and wherein the road object constitutes a further vehicle, comprises;

obtaining a reference position of the further vehicle relative to the vehicle, wherein the obtaining further comprises obtaining the reference position as a location of the further vehicle relative to the vehicle;

tracking the further vehicle, whereby the relative position of the further vehicle in relation to the vehicle is monitored;

updating a reach of a confidence zone of the vehicle, wherein a part of the estimated road geometry comprised within the confidence zone is associated with one or more known reference confidence levels; and determining the confidence level of the estimated road geometry based on whether the reference position is comprised in the confidence zone, wherein if the reference position of the further vehicle is comprised in the confidence zone the confidence zone is updated to comprise the road geometry up to the current position of the further vehicle.

The provided method is both reliable and robust. The method is furthermore not necessarily associated with complex calculations, and can thus be implemented in an efficient manner to determine confidence levels in delay-critical applications.

The one or more known reference confidence levels of the present disclosure can either reflect areas of road geometry which are estimated with low error magnitude, or areas of road geometry which are estimated with high error magnitude. Thus, the disclosed method is applicable in a wide range of scenarios.

According to some embodiments, the obtaining comprises sensing the reference position by one or more on-board reference position sensing sensors of the vehicle, and/or receiving the reference position via wireless transmission from the road object and/or from an external road entity.

The reference position can, according to the present teaching, be the position of another vehicle, or a position of some fixed traffic infrastructure, such as a group of lamp posts or road signs. Thus, the disclosed method can be applied in a wide variety of scenarios and different traffic infrastructures with and without other vehicles present.

Furthermore, a wide variety of options for obtaining said reference position is disclosed, providing for flexibility of the disclosed technique.

According to some embodiments, the updating further comprises sensing, by one or more on-board road boundary sensors of the vehicle, a road boundary in a proximity zone of the vehicle, and also updating the reach of the confidence zone to comprise said proximity zone.

In this way, the reach of the proximity zone is determined in a straight-forward and reliable manner by on-board sensors comprised in the vehicle. The extent, or reach, of the confidence zone is furthermore established without need for interaction with any entities external to the vehicle, providing a degree of autonomy.

According to some embodiments, the updating comprises obtaining information related to the reach of the confidence zone, via wireless transmission from an external road entity, and/or from a memory unit comprised in the vehicle, and also updating the reach of the confidence zone to reflect said received information.

Thus, further information about the traffic infrastructure surrounding the vehicle can, according to the present teaching, be exploited in determining the reach of the confidence zone and to refine the one or more reference confidence levels. In this way, a larger confidence zone can be obtained and the one or more reference confidence levels can be refined in granularity. The confidence zone can also be extended to include areas of the traffic infrastructure not directly visible or detectable from the vehicle.

According to some embodiments, the determining comprises determining the confidence level of a section of the estimated road geometry as having known error magnitude in case the section of the estimated road geometry is comprised within the confidence zone, and as having unknown error magnitude otherwise.

Thus, some embodiments of the disclosed method comprise determining the confidence level with two levels—known or not known, providing a simple and fast method of confidence level determination not associated with a wide variety of possible interpretations of the obtained confidence level.

There is also disclosed herein a computer program comprising computer program code which, when executed in a vehicle, causes the vehicle to execute a method according to any of the methods disclosed herein.

The object is also obtained by a control unit configured to determine a confidence level of an estimated road geometry, the road geometry being estimated at least partly based on a position of a road object external to a vehicle. The control unit comprises a processor and a memory storing computer program code which, when run in the processor, causes the control unit to obtain a reference position of the road object relative to the vehicle, and to update a reach of a confidence zone of the vehicle, wherein parts of the estimated road geometry comprised within the confidence zone is associated with one or more known reference confidence levels, as well as to determine the confidence level of the estimated road geometry based on whether the reference position is comprised in the confidence zone.

According to some embodiments, the control unit is configured to determine a confidence level of an estimated road geometry, the road geometry being estimated at least partly based on a position of a further vehicle external to a vehicle, comprises a processor and a memory storing computer program code. When the computer program code is run in the processor it causes the control unit to obtain a reference position of the further vehicle relative to the vehicle, wherein the reference position is a location of the further vehicle relative to the vehicle, to track the further vehicle, whereby the relative position of the further vehicle in relation to the vehicle is monitored, to update a reach of a confidence zone of the vehicle, wherein parts of the estimated road geometry comprised within the confidence zone is associated with one or more reference confidence level, and to determine the confidence level of the estimated road geometry based on whether the reference position is comprised in the confidence zone. If the reference position of the further vehicle is comprised in the confidence zone the confidence zone is updated to comprise the road geometry up to the current position of the further vehicle.

In addition to the control unit, there is furthermore disclosed herein a vehicle comprising the control unit according to the present technique.

The computer program, the control unit, and the vehicle, all display advantages corresponding to the advantages already described in relation to the methods.

BRIEF DESCRIPTION OF THE DRAWINGS

Further objects, features, and advantages of the present disclosure will appear from the following detailed description, wherein embodiments of the disclosure will be described in more detail with reference to the accompanying drawings, in which.

DETAILED DESCRIPTION

As required, detailed embodiments are disclosed herein. However, it is to be understood that the disclosed embodiments are merely exemplary and embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
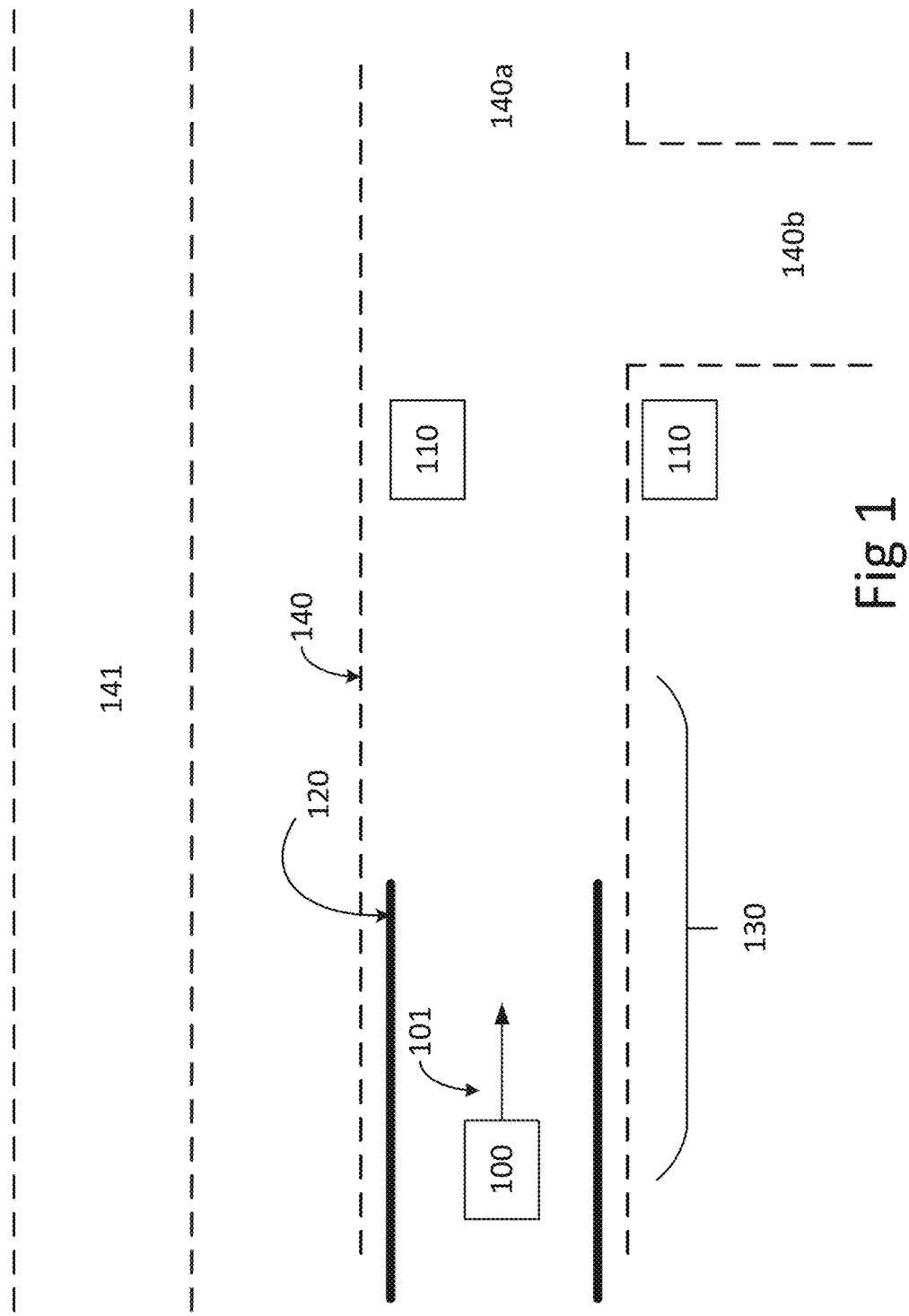
FIG. 1 schematically illustrates a vehicle in a traffic infrastructure according to some of the embodiments presented herein.

FIG. 1 schematically illustrates embodiments of a vehicle 100 on a road 140. The vehicle 100 is travelling in a forward direction 101 as indicated by the arrow extending from the vehicle 100. The vehicle 100 is in possession of an estimate of the geometry of the road 140 in the vicinity of the vehicle. This estimate includes the geometry of the road 140*a* up ahead of the vehicle and, according to some embodiments, also any exits 140*b* and other roads 141 in the vicinity of the road 140 on which the vehicle 100 is currently located.

There are also one or more road-objects 110 in the traffic infrastructure surrounding the vehicle 100. These road objects are, according to some embodiments, other vehicles such as, e.g., cars, trucks, and construction equipment. The road objects, according to some embodiments, also comprise objects in the fixed traffic infrastructure such as, e.g., lamp posts, road signs, and road toll-booths.

According to some embodiments of the present teaching, the vehicle 100 is configured to generate the estimate of road geometry autonomously, i.e., without any external assistance. In this case the vehicle actively estimates the geometry of the surrounding traffic infrastructure by means of, e.g., on-board sensors such as cameras and radar.

According to some other embodiments the vehicle 100 is arranged to receive an estimate of road geometry from an entity external to the vehicle 100, possibly via wireless communications equipment comprised in the vehicle 100. The vehicle 100, according to some embodiments, comprises a memory with stored road geometries and associated confidence levels, and the vehicle 100 is configured to retrieve an estimate of road geometry from memory corresponding to the current vicinity of the vehicle 100.

Thus, the estimated road geometry can be obtained by the vehicle 100 in a number of different ways. However, regardless of how said road geometry estimate is obtained by the vehicle 100, the road geometry is herein assumed to be estimated at least partly based on the position of one or more road objects 110.

As an example, the road geometry can be estimated based on the position of a further vehicle such as a car, truck, or bus, in front of the vehicle 100. The position of the further vehicle in front of the vehicle 100 is then monitored, i.e., the relative position of the further vehicle with respect to the vehicle 100 is tracked, and if that vehicle starts to turn, then it is likely that the road is also turning up ahead, which information can be used to refine the estimated road geometry.

Prior art related to road geometry was cited in the background section above, providing further examples of estimating road geometry in a vehicle 100.

As mentioned above, having access to an estimate of road geometry is not sufficient in many applications, and there is often a need to determine a confidence level associated with the estimated road geometry. This confidence level is, for instance, necessary in order for control systems in the vehicle, such as lane departure warning systems or systems for autonomous drive of the vehicle, to know what parts or sections of the estimated road geometry that can be trusted, i.e., used for control of the vehicle, and which parts of the estimated road geometry that are not trustworthy enough to be used for control of the vehicle.

Herein, the confidence level reflects the expected error magnitude of the estimated road geometry. A road geometry, or a section of road geometry, associated with a high confidence level has a known expected error magnitude, whereas a road geometry, or a section of road geometry, associated with a low confidence level has an unknown expected error magnitude. Error magnitude can be given in a wide variety of different metrics, including mean-squared-error, maximum error, or percentiles such as a 95-percentile error.

It is noted that a road geometry, or a section of road geometry, associated with a high confidence level is not necessarily accurately estimated, since herein the confidence level just reflects if the expected error magnitude is known, and if so to what degree the expected error magnitude is known.

Figure 2:
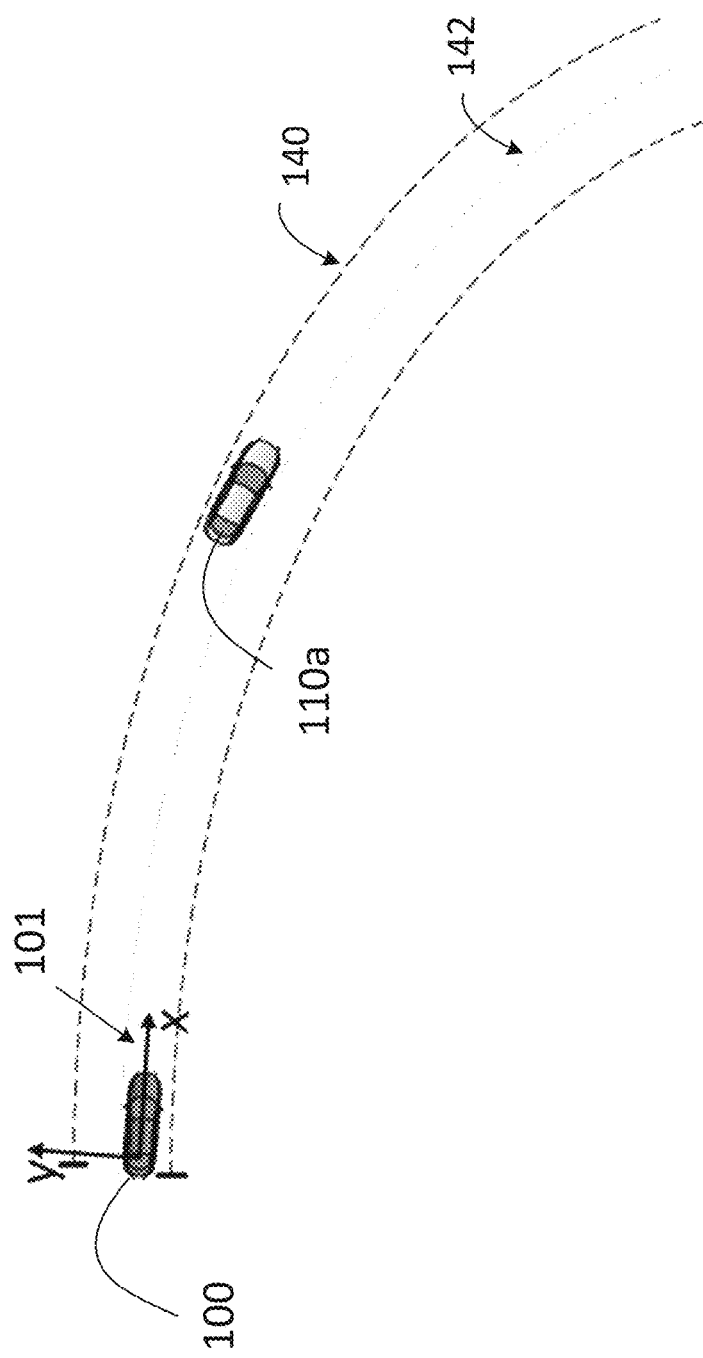
FIG. 2 schematically illustrates two vehicles on a road according to some of the embodiments presented herein.

FIG. 2 schematically illustrates two vehicles 100, 110*a* on a road 140 according to some of the embodiments presented herein. The vehicle 100 is here travelling on a road 140 with a curvature to the right relative to the forward direction 101 of the vehicle 100. The road geometry can, at least in part, be characterized by means of a center line 142 of the road 140.

The road geometry is, according to some embodiments, described by a polynomial function in two or three dimensions. According to other embodiments, the road geometry is described by an Euler spiral model, a clothoid model, or a Cornu spiral model. Further embodiments of the disclosure comprise road geometries described by sequences of coordinates in two or three dimensions, relative to the vehicle 100 or given in some global coordinate system. Road geometry is furthermore, according to some embodiments, modelled by means of splines, where the road is divided into disjoint segments. Thus, road geometries can be described in a number of different ways, and embodiments of the present teaching are applicable to at least all of the above examples.

The vehicle 100 is in possession of an estimated road geometry which has been estimated at least partly based on the position of a vehicle 110*a* located in front of the vehicle 100. Here, a coordinate system is defined by an x-axis given by the forward direction 101 of the vehicle 100, and a y-axis defined to be perpendicular to the x-axis. It should be appreciated that this is an example coordinate system. Other applicable coordinate systems can be defined based on, e.g., polar coordinates or global coordinates. Furthermore, the present teaching is applicable for estimated road geometries in two dimensions as well as in three dimensions. All positions and geometries, e.g., the position of the road object 110 and the estimated road geometry, is herein assumed to be defined relative to the vehicle 100.

In order to determine a confidence level of the estimated road geometry, the vehicle 100 in some example embodiments performs method steps according to the present teaching.

Figure 3:
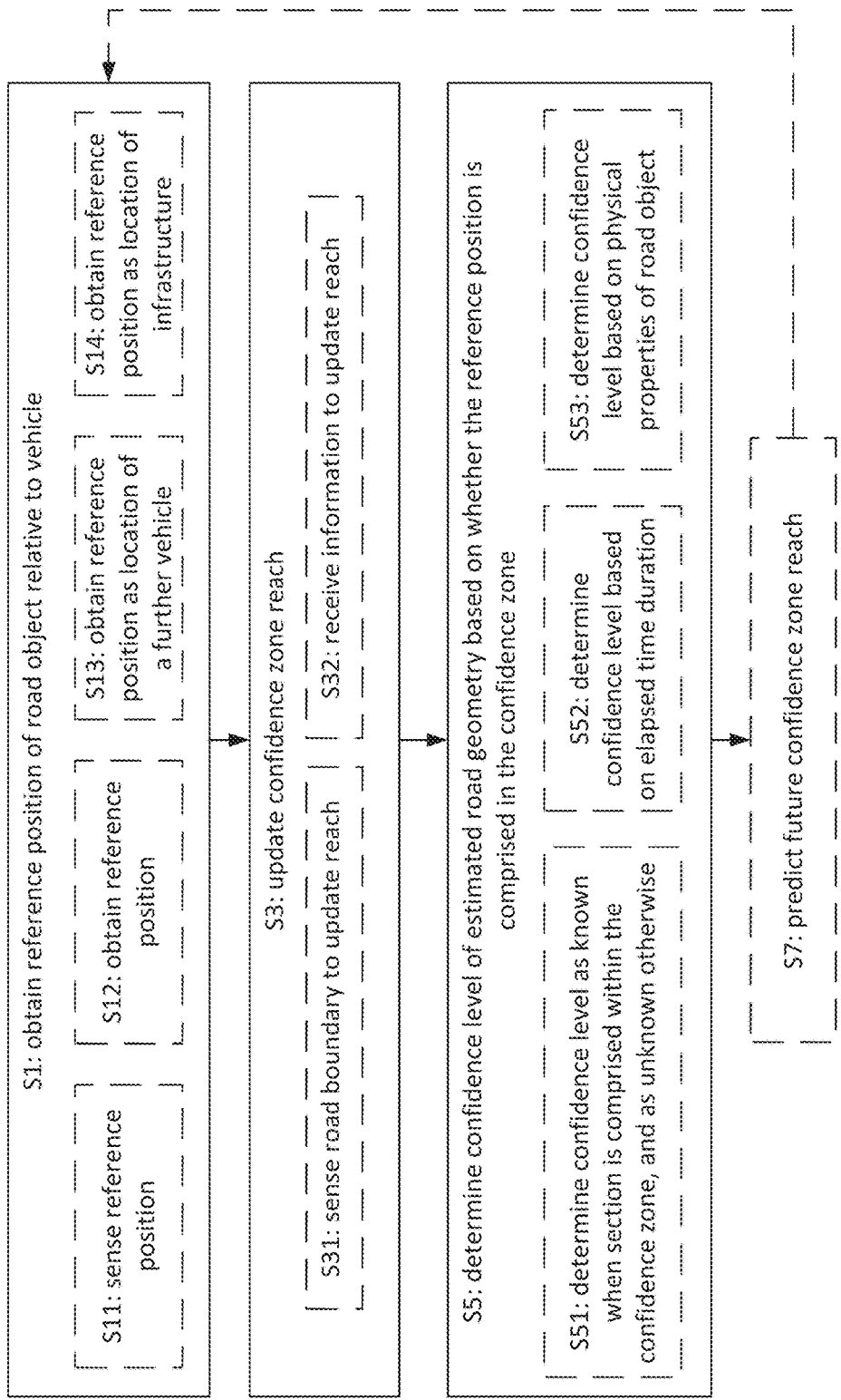
FIG. 3 is a flowchart illustrating method steps performed in a vehicle.

FIG. 3 is a flow chart illustrating such method steps according to the present teaching. In particular, there is illustrated a method performed in a vehicle 100 for determining a confidence level of an estimated road geometry.

The road geometry is here assumed to have been estimated at least partly based on a position of a road object relative to the vehicle.

It should be appreciated that the particular sequence of method steps illustrated in FIG. 3, i.e., S1 followed by S3 and then S5, is in no way limiting the present disclosure to this particular sequence. On the contrary, any of the method steps disclosed herein, or embodiments thereof, may be executed in any sequence, or in parallel. In particular, the sequence S3 followed by S1 and then S5 is comprised as an embodiment of the present teaching, as is a method where all steps S1, S3, and S5, including embodiments thereof, are executed in parallel.

There are many ways in which road geometry can be estimated based on the position of a road object 110 relative to the vehicle 100. For instance, assuming that the road object 110 maintains a substantially constant distance from the road object to, e.g., a center line 142 of the road 140, then the road geometry can be estimated by tracking the relative position of the road object, with respect to the vehicle 100, over time, and estimating the road geometry based on the determined track of the road object 110.

Turning again to FIG. 3, the method comprises obtaining S1 a reference position 111 of the road object 110 relative to the vehicle 100. This reference position 111 can be a single set of coordinates describing a single location relative to the vehicle 100 in two or three dimensions, or it can be a sequence or group of coordinates describing a plurality of locations relative to the vehicle 100 in two or three dimensions. Furthermore, the reference position 111 can be freely selected by the vehicle 100, i.e., a given reference position 111 can be replaced by another reference position 111 at any point in time, e.g., if the vehicle acquires a more suitable reference position, for instance with higher accuracy than an existing reference position.

Figure 4:
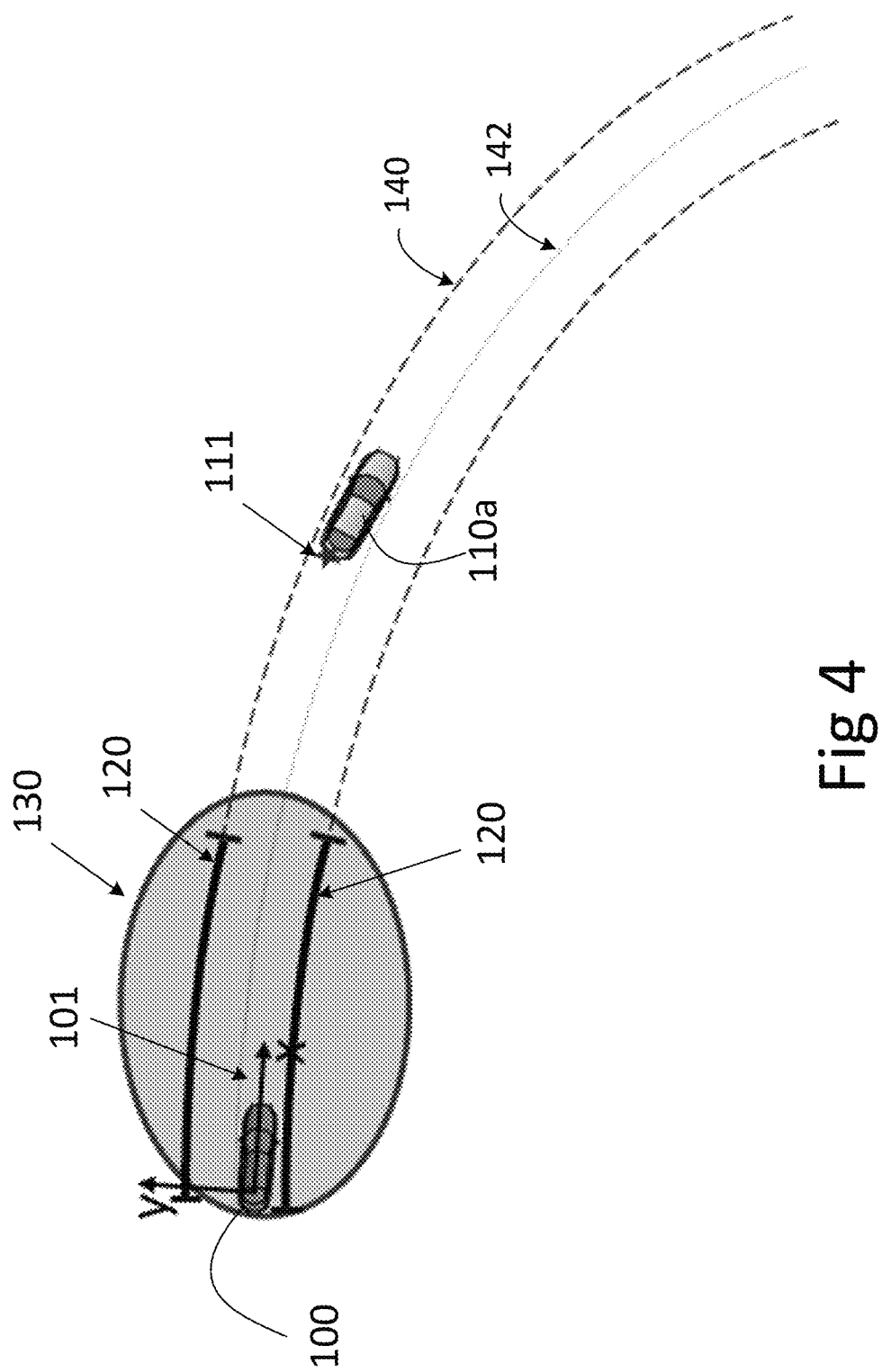
FIG. 4 schematically illustrates two vehicles on a road according to some of the embodiments presented herein.

Turning now to FIG. 4, which schematically illustrates an example traffic scenario of the present teaching. The road object 110 here constitutes a further vehicle 110a, and the obtaining S1 further comprises obtaining S13 the reference position 111 as a location of the further vehicle 110a relative to the vehicle 100.

The further vehicle 110a is located in front of the vehicle 100, i.e., along the road in the forward direction 101 of the vehicle 100, and the vehicle 100 has obtained a reference position 111 of the further vehicle 110a, marked in FIG. 4 by a star shape just aft of the further vehicle 110a.

Figure 5:
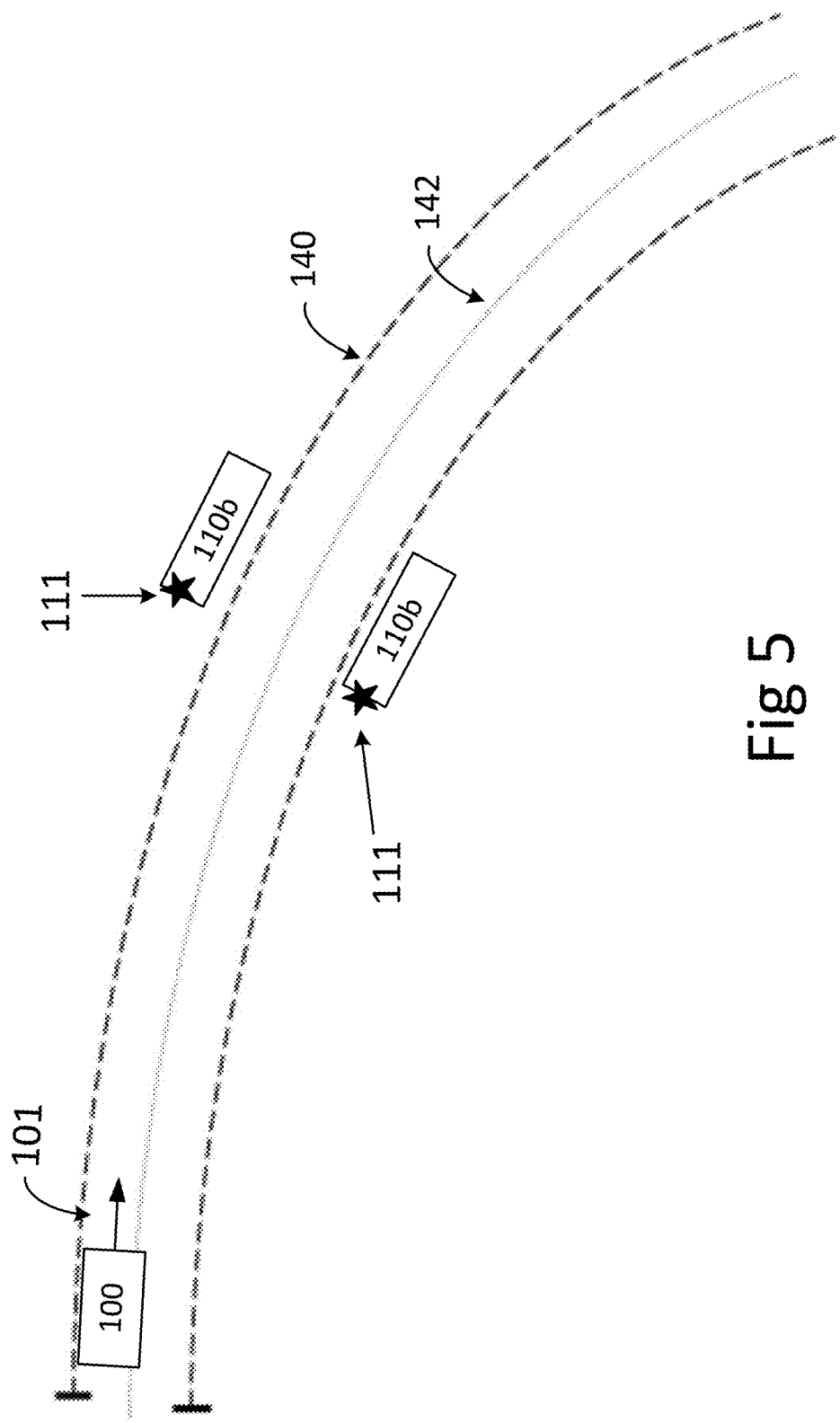
FIG. 5 schematically illustrates a road with traffic infrastructure according to some of the embodiments presented herein.

FIG. 5 illustrates another example traffic scenario where the vehicle 100 approaches fixed traffic infrastructure 110b. Consequently, the road object 110, according to some embodiments, constitutes one or more units of fixed road infrastructure 110b, and the obtaining S1 further comprises obtaining S14 the reference position 111 as a location of the one or more units of fixed road infrastructure 110b relative to the vehicle 100.

As noted above, this reference position 111 can be obtained by on-board sensors of the vehicle 100, or it can be obtained by an entity external to the vehicle, e.g., from the further vehicle via wireless communication between the vehicle 100 and the further vehicle 110a.

Thus, in other words, the obtaining S1, according to some embodiments, comprises sensing S11 the reference position 111 by one or more on-board reference position sensing sensors of the vehicle 100, and/or receiving S12 the reference position via wireless transmission from the road object 110 and/or from an external road entity.

It is noted that this reference position 111 is not continuously attached to the further vehicle 110a, but is a fixed location in the traffic infrastructure, e.g., on the road. Thus, as the vehicle 100 travels down the road 140, the fixed reference position 111 will come nearer to the vehicle 100, eventually being passed over by the vehicle 100, even if the distance between the vehicle 100 and the further vehicle 110a remains constant.

The method illustrated in FIG. 3 further comprises updating S3 a reach of a confidence zone 120 of the vehicle 100, wherein a part of the estimated road geometry comprised within the confidence zone is associated with one or more known reference confidence levels.

Thus, the vehicle 100 is associated with a confidence zone 120 and is further in possession of one or more reference confidence levels of the confidence zone 120. This means that the vehicle knows one or more confidence levels of at least the parts of the estimated road geometry comprised within the confidence zone 120.

Turning to FIG. 4, in example, the vehicle 100 has updated its confidence zone 120 to comprise a stretch of road 140 in front of the vehicle 100, based on, e.g., road boundary sensor readings in a proximity zone 130 of the vehicle 100.

In some example embodiments, the vehicle 100 is equipped with high precision on-board sensors configured to detect a road boundary in a proximity zone 130 surrounding the vehicle. The vehicle 100 here knows a-priori the precision of the data delivered from the on-board sensors and can therefore in this way obtain the one or more reference confidence levels associated with the confidence zone 120.

In some example embodiments, the vehicle 100 is equipped with on-board sensors configured to detect a road boundary in a proximity zone 130 surrounding the vehicle. Here, the on-board sensors are configured to report the detected road boundary together with a determined confidence level of the detected road boundary. Thus, the vehicle 100 knows the precision of the data delivered from the on-board sensors and thus obtains the one or more reference confidence levels associated with the confidence zone 120.

Said road boundary can, according to different embodiments, comprise a lane marking, a boundary between a road and a side-walk, and a boundary between a road and some other material different from the material of the road, e.g., grass or gravel.

Thus the reach, or extent, of the proximity zone 130 is, according to embodiments, pre-determined or obtained by means of information reported by the sensors supplying the sensor readings.

In other words, the updating S3 according to some embodiments comprises sensing S31, by one or more on-board road boundary sensors of the vehicle 100, a road boundary in a proximity zone 130 of the vehicle 100, and updating the reach of the confidence zone 120 to comprise said proximity zone 130.

Apart from updating the reach of the confidence zone 120 of the vehicle 100 based on sensing S31, the updating S3, according to some embodiments, comprises obtaining S32 information related to the reach of the confidence zone 120, via wireless transmission from an external road entity, and/or from a memory unit comprised in the vehicle 100, and updating the reach of the confidence zone 120 to reflect said received information. Thus, the vehicle 100 according to some embodiments determines the reach of the confidence zone based on information received from sources external to the vehicle. For instance, an external entity such as a road-side communications device configured in a toll-booth, can be in possession of information related to the confidence level of the surrounding traffic infrastructure. If the vehicle 100 can establish a clear relationship between its own position and the information related to the confidence level of the surrounding traffic infrastructure, then the vehicle 100 can incorporate this information to update the reach of the confidence zone.

For instance, suppose the vehicle 100 is approaching a road-side station of some kind, e.g., a gas-station configured to position approaching vehicles, and to communicate with approaching vehicles using wireless communications equipment. The road-side station then positions the vehicle relative to the road-side station, and transmits this relative position data to the vehicle together with information related to the surrounding infrastructure of the road-side station. Thus, having received this information, the vehicle can update its confidence zone to comprise the zone described in the information received from the road-side station.

It is thus understood that the confidence zone 120 can comprise a disjoint collection of sub-zones. I.e., the confidence zone can be made up of a plurality of separated areas in the traffic infrastructure surrounding the vehicle. A first part of the confidence zone may thus be located in the immediate vicinity of the vehicle 100, while a second part of the confidence zone may be located down the road some distance away from the vehicle 100 and separated from the first part.

Figure 9:
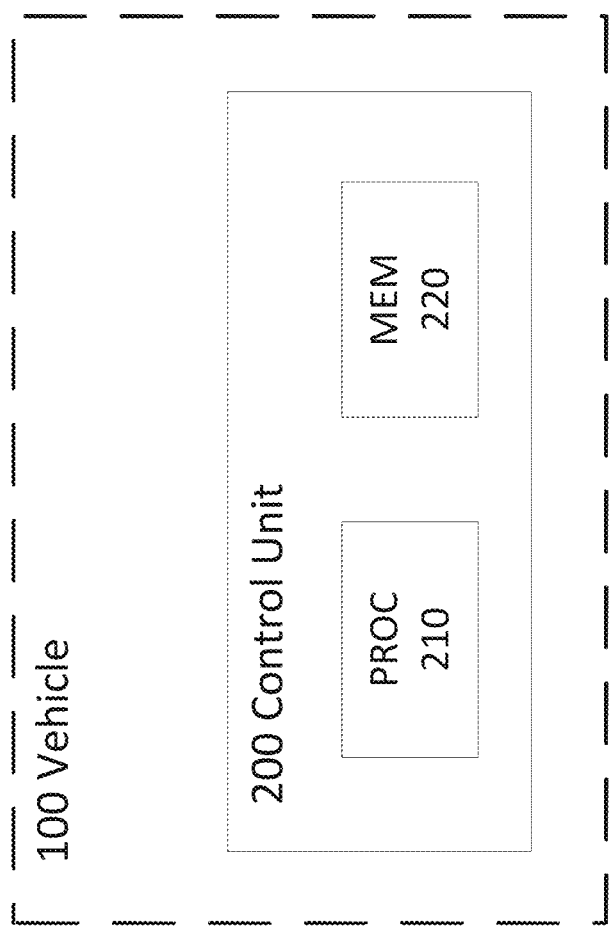
FIG. 9 is a schematic block diagram illustrating embodiments of a control system in a vehicle.

Furthermore, with reference to FIG. 9, the vehicle 100 is according to some embodiments equipped with a memory unit 220 allowing the vehicle 100 or a pre-configuration entity external to the vehicle to store estimated road geometries and associated confidence levels in the memory unit 220 of the vehicle 100. Thus, if the vehicle approaches a section of the traffic infrastructure which has already been estimated and associated with a confidence level, and stored in the memory unit 220, then the vehicle 100 can retrieve this information and use the information to update the confidence zone.

Turning back to FIG. 3, the method further comprises determining S5 the confidence level of the estimated road geometry based on whether the reference position 111 is comprised in the confidence zone 120.

The determining of the confidence level is thus performed by comparing the reference position 111 to the current reach of the confidence zone 120. If the reference position 111 is comprised in the confidence zone, then this implies that the estimated road geometry is associated with a known reference confidence level at the location of the reference position 111. Thus, a connection between the location of the road object 110 relative to the vehicle 100, and the estimated road geometry is established. On the other hand, if the reference position 111 is not comprised in the confidence zone, then the vehicle 100 does not know if the road geometry estimate around the location of the reference position 111 is estimated with high accuracy or with low accuracy, which means that the confidence level of the estimate of road geometry up to the current location of the road object 110 cannot be determined properly.

For example, if the accuracy of the estimated road geometry is known to be high throughout the confidence zone 120, then the relationship between the reference position 111 and the estimated road geometry is also known with high accuracy. Such a strong connection between reference position and estimated road geometry can then be used to extend the confidence zone towards the current location of the road object 110. This concept will be further exemplified in connection to FIGS. 6-8 below.

There are several different methods which can be used to determine the confidence level of the estimated road geometry based on whether the reference position 111 is comprised in the confidence zone 120. For instance, knowledge of the accuracy of on-board sensors in the vehicle can be used to determine the confidence level. In case the accuracy of the on-board sensors is known, and the reference position is comprised within the confidence zone, then knowledge of the accuracy of the on-board sensors used to update the confidence zone, together with knowledge of the accuracy of the on-board sensors used to obtain the reference position, will together reflect the confidence level of the estimated road geometry, at least in parts of the estimated road geometry where the road-object has been tracked.

As another example, suppose that the reference position 111 upon which the estimated road geometry is based has been obtained with a radar detection known to be of high accuracy, then the confidence level would be higher than in a scenario where the reference position 111 upon which the estimated road geometry is based has been obtained with a radar detection of uncertain accuracy, e.g., due to difficulty in associating a plurality of radar detections with one or more road-objects.

According to some embodiments, in case the obtaining S1 is performed in sequence prior to the updating S3, such that, e.g., the sequence of steps taken is S1 then S3 followed by S5, the determining S5 comprises determining S51 the confidence level of a section of the estimated road geometry as having known error magnitude in case the section of the estimated road geometry is comprised within the confidence zone 120, and as having unknown error magnitude otherwise.

Thus, a coarse quantization is applied to the determined confidence level, allowing for ease of implementation and also for a straight forward interface between a control system implementing the present method and a control system configured to use the determined confidence level data.

Figure 8:
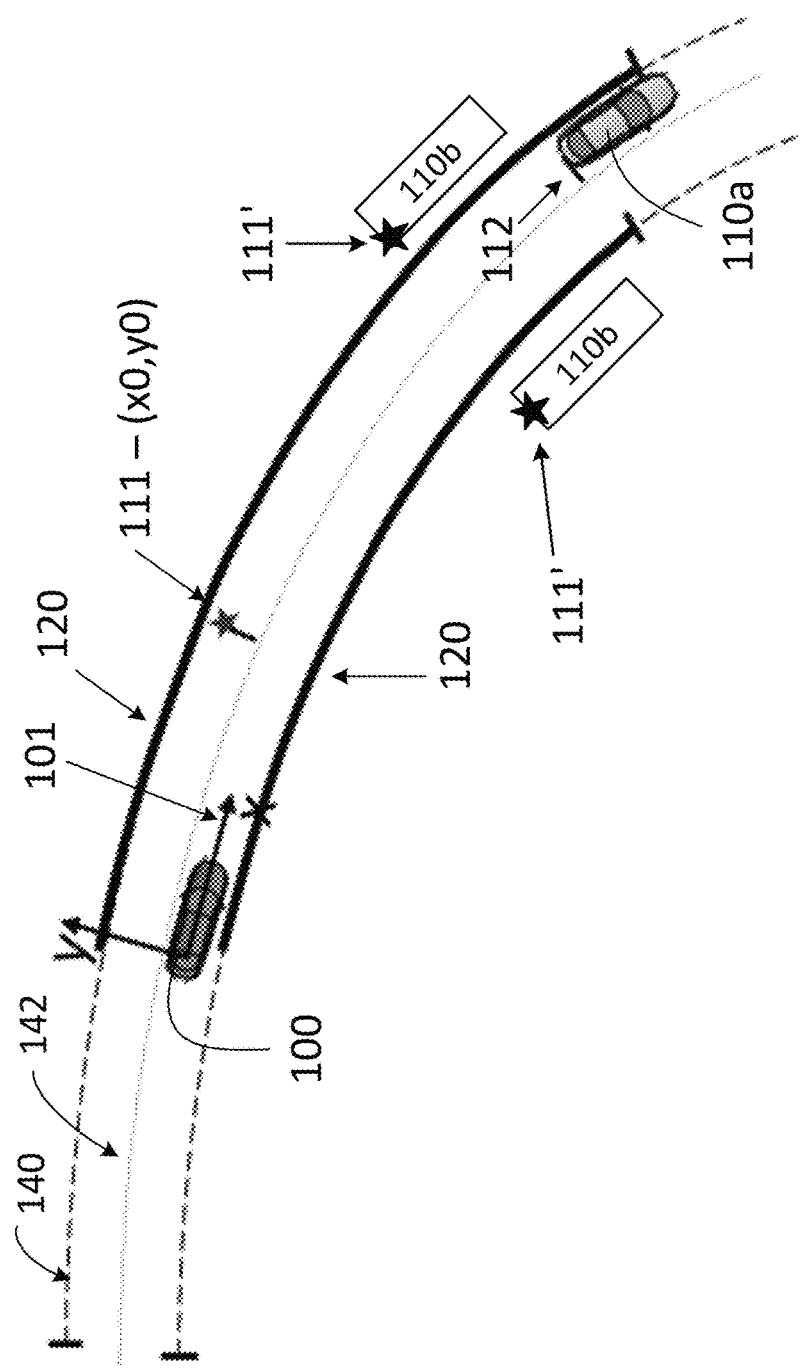

With reference to at least FIG. 4 and FIG. 8, the above-mentioned section of the estimated road geometry, according to some embodiments, stretches in a forward direction 101 of the vehicle 100, from a boundary of the confidence zone and at least partway to the road object 120.

According to some embodiments, a first section of estimated road geometry is located outside of the confidence zone 120 of the vehicle, and is comprised on a stretch of road 140 between the vehicle 100 and a further vehicle 110a, which further vehicle 110a is being tracked and used for road geometry estimation. Then, in case the obtaining S1 is performed in sequence after the updating S3, such that, e.g., the sequence of steps taken is S3 then S1 followed by S5, the determining S5 comprises determining the confidence level of the first section as having known error magnitude in case the reference position 111 is comprised in the confidence zone 120 and as having unknown error magnitude otherwise.

Again, a coarse quantization is applied to the determined confidence level, allowing for ease of implementation and also for a straight forward interface between a control system implementing the present method and a control system configured to use the determined confidence level data.

The present technique achieves improved results if the geometrical relationship between the road object and the road, e.g., the center line of the road, does not change rapidly or unexpectedly. However, in many scenarios a fixed relationship over time cannot be guaranteed to exist between the location or locations of the road object in relation to the road over time. Thus, the time elapsed from the obtaining S1 to the determining S5 is, according to some embodiments, of importance in determining the confidence level of the estimated road geometry. In other words the determining S5 according to some embodiments comprises determining S52 the confidence level of the estimated road geometry based on an elapsed time duration measured from the obtaining S1 of the reference position 111 to the determining S5 of the confidence level. According to some embodiments, the confidence level of the estimated road geometry decreases with increasing elapsed time duration measured from the obtaining S1 of the reference position 111 to the determining S5 of the confidence level.

In addition, some road objects can be expected to have a more dynamic geometrical relationship with the road geometry than other road objects. For instance, a heavy truck is less likely to exhibit rapid change of trajectory than, e.g., a motorcycle is. A piece of fixed traffic infrastructure, such as a sequence of lamp posts, can be expected to remain at a near constant geometrical relationship to the road 140. Thus, the determining S5 according to some embodiments comprises determining a set of physical properties of the road object 110, and determining S53 the confidence level of the estimated road geometry based on the set of physical properties of the road object 120. These physical properties, according to some embodiments, include estimated size, type of vehicle or object, and also historic motion pattern. According to some embodiments, the confidence level of the estimated road geometry decreases with increasing dynamic geometrical relationship of the road object with respect to the road geometry. Consequently, according to some embodiments, the confidence level of a road geometry estimated based on the position of a heavy truck is judged to be higher than a confidence level of a corresponding road geometry estimated based on the position of, e.g., a motorcycle.

Up until now, only an established or current reach of the confidence zone 120 has been discussed. However, according to the present teaching, it also possible to predict the reach of the confidence zone at a future time instant. Thus, the method, according to some embodiments, further comprises predicting S7 a future reach of the confidence zone 120 corresponding to a reach of the confidence zone at a future time instant, said prediction being based the reference position 111 and on a current position of the road object 110.

As an example, suppose that a reference position 111 has been obtained, and that a current section of estimated road geometry is associated with a low confidence level, meaning that the magnitude of error in this section of estimated road geometry is largely unknown. Suppose further that the vehicle 100 is travelling towards the reference position 111, but has not yet reached a position on the road where the confidence zone 120 comprises the reference position 111. The vehicle 100 is then, according to some embodiments, configured to predict that the confidence level of sections of estimated road geometry where the road object is currently located will be associated with a higher confidence level as soon as the obtained reference position enters the confidence zone. This instant in time when the reference position enters the confidence zone can be determined, i.e., predicted, based on the reference position 111 relative to the vehicle, the current reach of the confidence zone, and the speed of the vehicle 100.

The method steps illustrated in FIG. 3 is, according to some embodiments, repeated, shown in FIG. 3 by a dashed line connecting the predicting S7 and the obtaining S1.

Figure 6:
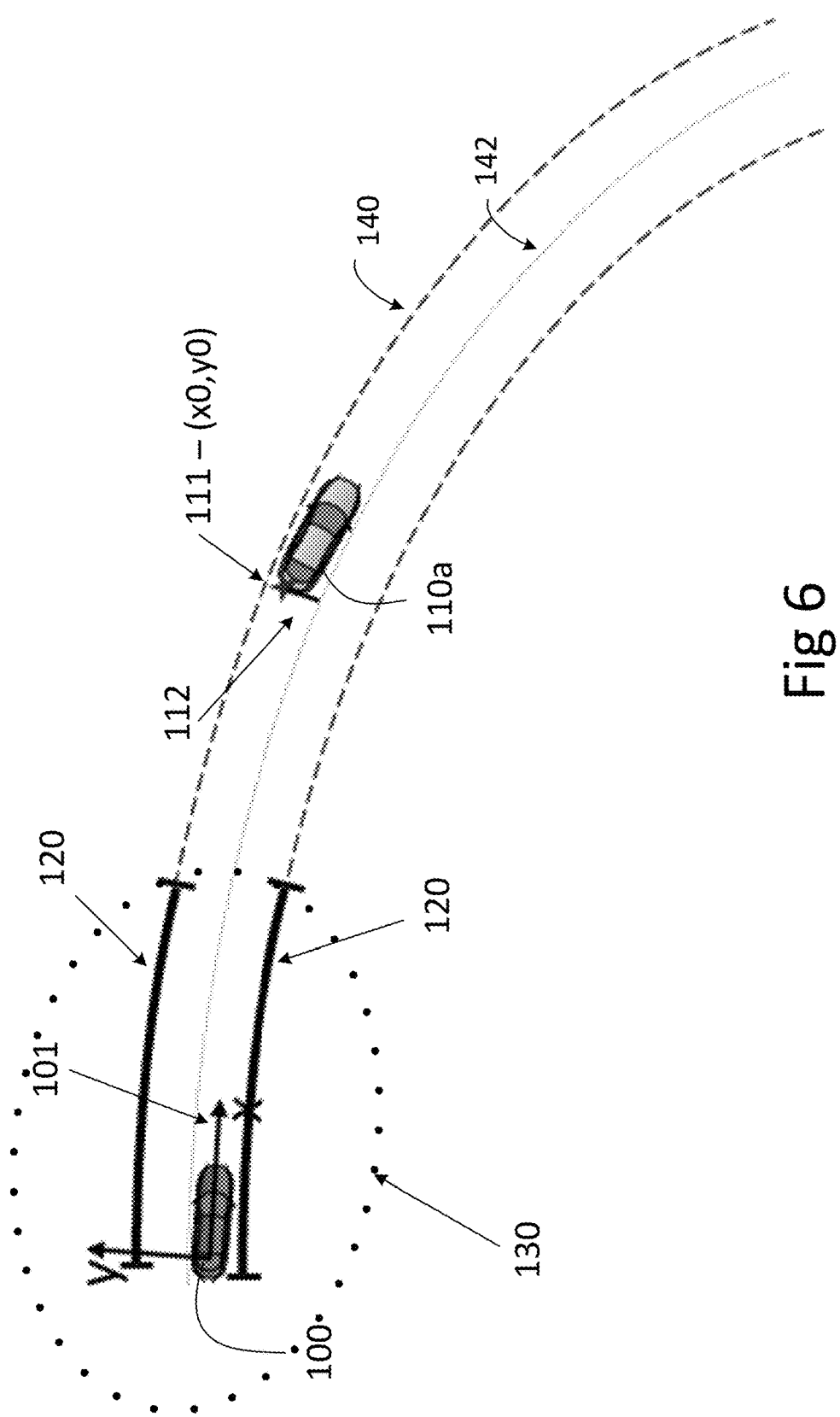
FIGS. 6-8 illustrate an example sequence of events according to some of the embodiments presented herein.
Figure 7:
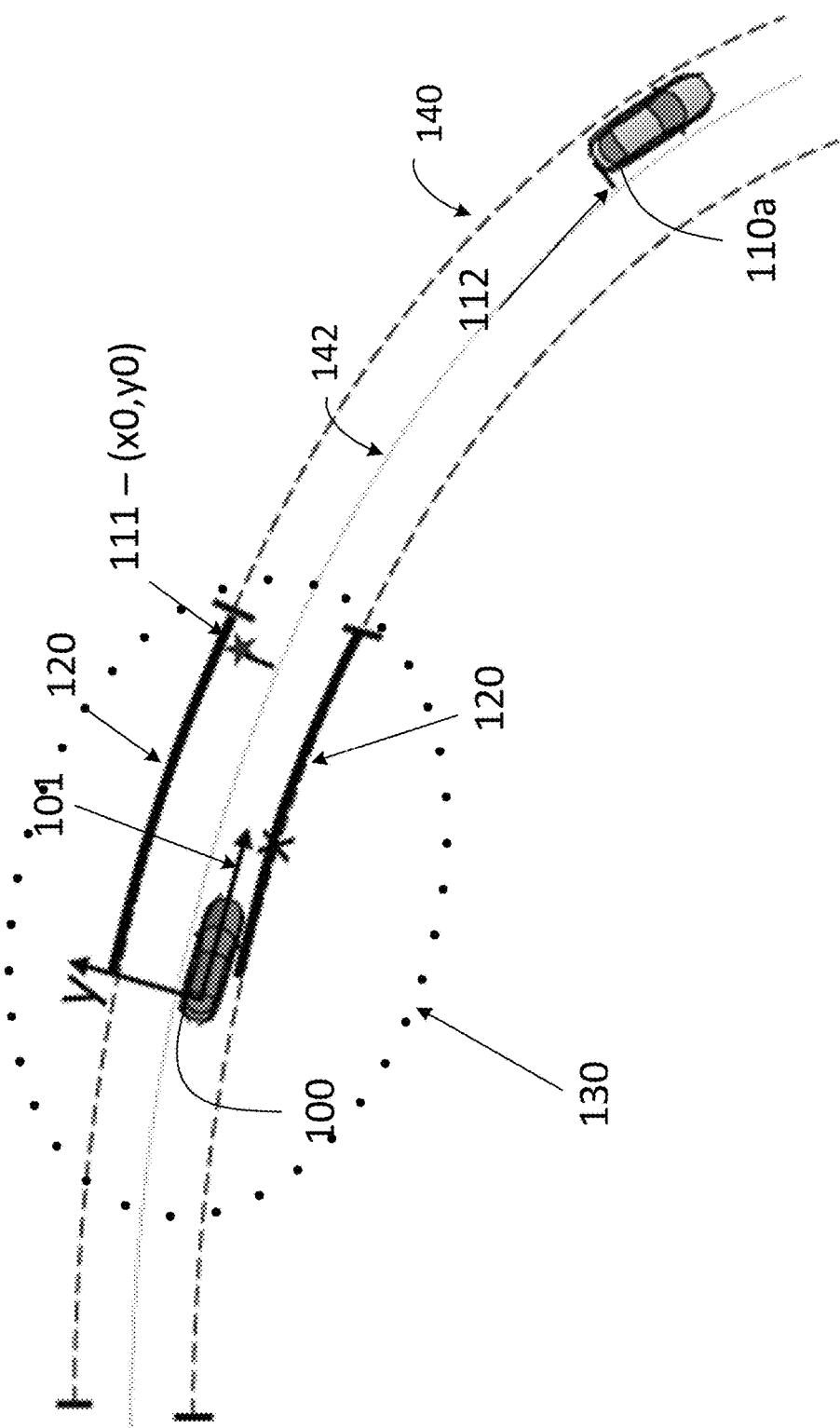

In order to further illuminate the present teaching, FIGS. 6-8 illustrate an example sequence of events according to some embodiments of the present technique. A vehicle 100 is here travelling in a forward direction 101 on a road 140, with a road geometry defined by a center line 142. The vehicle is in possession of an estimated road geometry, and there is a confidence zone 120 associated with the estimated road geometry.

The vehicle 100 shown in FIG. 6 has obtained a reference position 111 of a further vehicle 110a down the road 140. Here, the reference position 111 relates the location of the further vehicle 110a, relative to the vehicle 100, to the road geometry by a distance to the center line 142 of the road, shown in FIG. 6 by a line 112 drawn from the reference position 111 to the center line 142. In a global coordinate system, the coordinates of the reference position, in two dimensions, is (x0,y0).

The vehicle 100 in FIG. 6 has furthermore updated the reach of the confidence zone 120 to comprise a proximity zone 130 of the vehicle 100, shown in FIG. 6 by a dotted elliptical region centered on the vehicle 100, wherein lane markings on the road is detected by on-board sensors. The on-board sensors of the vehicle 100 supply information related to the expected accuracy of the detected lane markings, and this accuracy is high throughout the confidence zone 120 shown in FIG. 6. Thus, the part of the estimated road geometry of the road 140 which is comprised within the confidence zone 120 is associated with a known reference confidence level, and the estimated road geometry comprised in the confidence zone 120 is associated with a small error magnitude.

In the example scenario shown in FIG. 6, the vehicle 100 determines the confidence level of the estimated road geometry, based on whether the reference position 111 is comprised in the confidence zone 120, as having a high confidence level within the confidence zone 120 shown by the heavy lines, and as having a low confidence level outside of the confidence zone 120. Road geometry estimates corresponding to sections of road located between the vehicle 100 and the further vehicle 110a and outside of the confidence zone 120 are associated with low confidence levels since the reference position 111 is not yet comprised in the confidence zone 120, which means that the relation between the relative position of the further vehicle 110a and the road geometry is uncertain. However, given the reference position 111, the current reach of the confidence zone, and the current speed of the vehicle, the vehicle is able to predict when the reach of the confidence zone is expected to expand towards the further vehicle 110a.

Turning now to FIG. 7, some time has passed compared to FIG. 6, and the vehicle 100 has travelled to a position such that the reference position 111 is now comprised by the confidence zone 120.

According to the present teaching, the vehicle 100 obtains the reference position 111, which in this example is the same reference position 111 as was obtained at the time instant illustrated in FIG. 6. Thus, in FIG. 7, the coordinates of the reference position, in a global coordinate system in two dimensions, is still (x0,y0). The vehicle 100 also updates the confidence zone 120 to reflect the fact that the vehicle has travelled some distance since the last update, and therefore the proximity zone has been translated along the road by a given amount. After the updating, the vehicle determines the confidence level of the estimated road geometry, again based on whether the reference position 111 is comprised in the confidence zone 120. Now, the reference position 111 is indeed comprised in the confidence zone 120, and the confidence level of the estimated road geometry is therefore increased along the road 140 up to the further vehicle 110a. Thus, when the vehicle 100 next updates the reach of the confidence zone 120, the confidence zone will extent all the way up to the further vehicle 110*a*. This extended confidence zone 120 is illustrated in FIG. 8.

Note that as the confidence zone 120 expands, as shown in FIG. 8, other reference positions 111' obtained with respect to other road-objects 110*b* can become comprised within the expanded confidence zone, thus leading to an advantageous domino-effect resulting in a confidence zone with extended reach. This domino-effect further enables prediction of time instants when any additional further vehicles on the road 140 in front of the vehicle 100 will be travelling on a section of road comprised within the confidence zone 120.

In order to even further illuminate the present teaching; another example sequence of events of the present teaching will now be given.

Suppose a vehicle is associated with a confidence zone that stretches along a road on which the vehicle is travelling, and up to a further vehicle in front of the vehicle. The confidence zone is continuously extended by application of some embodiments of the present method to match a forward motion of the further vehicle in pace with any positioning data obtained with respect to the further vehicle. Thus, the confidence zone is extended piece by piece as additional positioning data related to the further vehicle becomes available to the vehicle.

According to one example embodiment of the present teaching, one or more reference positions are first obtained by the vehicle with respect to one or more road objects. In connection to the obtaining of reference positions, one or more road boundaries are also detected by the vehicle. The vehicle then updates the confidence zone to reflect the newly obtained reference positions and detected road boundaries.

In case one or more road objects are located further away from the vehicle than the detected road boundary stretches, then the relationship between the one or more reference positions of the road objects and the reach of the confidence zone will determine the reach of the updated confidence zone, i.e., if one or more of the reference positions are comprised within the confidence zone or not. In case the road objects are already comprised within the zone wherein road boundary is detected with known confidence level, i.e., the proximity zone, then the reach of the proximity zone will determine the reach of the confidence zone after the updating.

A particularly advantageous effect occurs if, after updating the confidence zone, one or more additional reference positions become comprised within the new confidence zone. In this case the reach of the confidence zone can potentially be further extended, thus providing for an advantageous domino-effect yielding a confidence zone with an extended reach compared to, e.g., a system which only utilizes road boundary sensors for determining confidence level. Consequently, the present method, according to some embodiments, provides a confidence zone with extended reach.

In order to provide a further example sequence of events, suppose that a first and a second further vehicle are located in front of a vehicle on a road. Assume that the first such further vehicle has been positioned and tracked successfully during an extended period of time by the vehicle, and that the reference position of the first further vehicle has been comprised by a confidence zone of the vehicle. The confidence zone in this example therefore extends all the way from the vehicle and along the road up to the first further vehicle. Now, if the on-board sensors of the vehicle cannot detect road boundary with known confidence level all the way up to the first further vehicle, then, in this example, as soon as new positioning data related to the first further vehicle becomes available, the confidence zone will be extended along the road to match this data. Furthermore, if the first further vehicle reaches a position on the road corresponding to the reference position of the second further vehicle, then the confidence zone will be further extended towards the second further vehicle, potentially all the way from the vehicle and up to the second further vehicle. Consequently, the present method, according to some embodiments, provides a confidence zone with extended reach.

Turning now to FIG. 9 where a schematic block diagram illustrating some embodiments of a control unit 200 in a vehicle 100 is shown. In particular, there is shown a control unit 200 configured to determine a confidence level of an estimated road geometry. The road geometry is estimated at least partly based on a position of a road object 110 external to the vehicle 100. The control unit 200 comprises a processor 210 and a memory 220 storing computer program code which, when run in the processor 210, causes the control unit 200 to obtain a reference position 111 of the road object 110 relative to the vehicle 100. The computer program code, when run in the processor 210, further causes the control unit 200 to update a reach of a confidence zone 120 of the vehicle 100, wherein parts of the estimated road geometry comprised within the confidence zone is associated with one or more reference confidence level, and also to determine the confidence level of the estimated road geometry based on whether the reference position 111 is comprised in the confidence zone 120.

Thus, the control unit 200 is arranged to perform some embodiments of the present teaching as discussed above in connection to FIGS. 1-8.

According to some such embodiments, the control unit 200 is configured to sense a road boundary in a proximity zone 130 of the vehicle 100 by one or more on-board road boundary sensors of the vehicle 100. The computer program code, when run in the processor 210, then further causes the control unit 200 to update the reach of the confidence zone 120 to comprise said proximity zone 130, and to determine the confidence level of a section of the estimated road geometry located outside of the confidence zone 120 as having known error magnitude in case the reference position 111 is comprised in the confidence zone 120 and as having unknown error magnitude otherwise.

According to some embodiments, the section of the estimated road geometry stretches along the estimated road geometry in a forward direction 101 of the vehicle 100, from a boundary of the confidence zone and at least partway to the road object 120.

There is also shown in FIG. 9 a vehicle 100 comprising the control unit 200 according to some of the embodiments presented herein. This vehicle, in some example embodiments, correspond to the vehicle 100 shown in and discussed in connection to any of FIG. 1 and in FIGS. 3-8.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A method performed by a control unit in a vehicle for determining a confidence level of an estimated road geometry, the road geometry being estimated at least partly based on a position of a road object relative to the vehicle, wherein the road object comprises a further vehicle, the method comprising:
    obtaining a reference position based on the further vehicle relative to the vehicle, wherein the reference position is a fixed location based on an initial position of the further vehicle relative to the vehicle;
    tracking the further vehicle, wherein a relative position of the further vehicle in relation to the vehicle is monitored;
    updating a reach of a confidence zone of the vehicle, wherein a part of the estimated road geometry comprised within the confidence zone is associated with one or more reference confidence levels;
    determining the confidence level of the estimated road geometry based on whether the reference position is comprised in the confidence zone, wherein, in response to the reference position being comprised in the confidence zone, the confidence zone is updated to comprise the road geometry up to a current position of the further vehicle; and
    generating a signal representative of the determined confidence level of the estimated road geometry as input for a vehicle control system reliant on estimated road geometry for controlling the vehicle.

2. The method according to claim 1 wherein updating further comprises sensing, by one or more on-board road boundary sensors of the vehicle, a road boundary in a proximity zone of the vehicle, and updating the reach of the confidence zone to comprise the proximity zone.

3. The method according to claim 1 wherein updating further comprises obtaining information related to the reach of the confidence zone, via wireless transmission from an external road entity, and/or from a memory unit comprised in the vehicle, and updating the reach of the confidence zone to reflect the received information.

4. The method according to claim 1 wherein obtaining further comprises sensing the reference position by one or more on-board reference position sensing sensors of the vehicle, and/or receiving the reference position via wireless transmission from the road object and/or from an external road entity.

5. The method according to claim 1 wherein the road object further comprises one or more units of fixed road infrastructure, and wherein the obtaining further comprises obtaining the reference position as a location of the one or more units of fixed road infrastructure relative to the vehicle.

6. The method according to claim 1 wherein the determining comprises determining the confidence level of a section of the estimated road geometry as having known error magnitude in response to the section of the estimated road geometry being comprised within the confidence zone, and as having unknown error magnitude otherwise.

7. The method according to claim 6, the section of the estimated road geometry stretching in a forward direction of the vehicle, from a boundary of the confidence zone and at least partway to the road object.

8. The method according to claim 1 wherein the determining comprises determining the confidence level of the estimated road geometry based on an elapsed time duration measured from the obtaining of the reference position to the determining of the confidence level.

9. The method according to claim 1 further comprising predicting a future reach of the confidence zone corresponding to a reach of the confidence zone at a future time instant, the prediction being based on the reference position and on a current position of the road object.

10. A non-transitory storage medium having computer program code stored therein, wherein the computer program code, when executed in a vehicle by a control unit configured to determine a confidence level of an estimated road geometry, the road geometry being estimated at least partly based on a position of a further vehicle external to the vehicle, enables the vehicle to:
    obtain a reference position based on the further vehicle relative to the vehicle, wherein the reference position is a fixed location based on an initial position of the further vehicle relative to the vehicle;

track the further vehicle, wherein a relative position of the further vehicle in relation to the vehicle is monitored;

update a reach of a confidence zone of the vehicle, wherein a part of the estimated road geometry comprised within the confidence zone is associated with one or more reference confidence levels;

determine the confidence level of the estimated road geometry based on whether the reference position is comprised in the confidence zone, wherein, in response to the reference position being comprised in the confidence zone, the confidence zone is updated to comprise the road geometry up to a current position of the further vehicle; and generate a signal representative of the determined confidence level of the estimated road geometry as input for a vehicle control system reliant on estimated road geometry for controlling the vehicle.

11. A control unit configured to determine a confidence level of an estimated road geometry, the road geometry being estimated at least partly based on a position of a further vehicle external to a vehicle, the control unit comprising;

a processor; and a memory storing computer program code which, when run in the processor, causes the control unit to obtain a reference position based on the further vehicle relative to the vehicle, wherein the reference position is a fixed location based on an initial position of the further vehicle relative to the vehicle, track the further vehicle, wherein a relative position of the further vehicle in relation to the vehicle is monitored, update a reach of a confidence zone of the vehicle, wherein a part of the estimated road geometry comprised within the confidence zone is associated with one or more reference confidence levels, determine the confidence level of the estimated road geometry based on whether the reference position is comprised in the confidence zone, wherein, in response to the reference position being comprised in the confidence zone, the confidence zone is updated to comprise the road geometry up to a current position of the further vehicle, and generate a signal representative of the determined confidence level of the estimated road geometry as input for a vehicle control system reliant on estimated road geometry for controlling the vehicle.

12. The control unit according to claim 11 wherein one or more lane marking sensors on-board the vehicle is configured to sense a lane marking in a proximity zone of the vehicle, and wherein the computer program code, when run in the processor, further causes the control unit to update the reach of the confidence zone to comprise the proximity zone, and determine the confidence level of a section of the estimated road geometry located outside of the confidence zone as reliable in response to the reference position being comprised in the confidence zone and as unreliable otherwise.

13. The control unit according to claim 12, the section of the estimated road geometry stretching along the estimated road geometry in a forward direction of the vehicle, from a boundary of the confidence zone and at least partway to the road object.

14. A vehicle comprising:

a control unit configured to determine a confidence level of an estimated road geometry, the road geometry being estimated at least partly based on a position of a further vehicle external to the vehicle, the control unit comprising a processor; and a memory storing computer code which, when executed by the processor, causes the control unit to obtain a reference position based on the further vehicle relative to the vehicle, wherein the reference position is a fixed location based on an initial position of the further vehicle relative to the vehicle, track the further vehicle, wherein a relative position of the further vehicle in relation to the vehicle is monitored, update a reach of a confidence zone of the vehicle, wherein a part of the estimated road geometry comprised within the confidence zone is associated with one or more reference confidence levels, determine the confidence level of the estimated road geometry based on whether the reference position is comprised in the confidence zone, wherein, in response to the reference position of the further vehicle being comprised in the confidence zone, the confidence zone is updated to comprise the road geometry up to a current position of the further vehicle, and generate a signal representative of the determined confidence level of the estimated road geometry as input for a vehicle control system reliant on estimated road geometry for controlling the vehicle.

* * * * *